H. W. JACOBS & R. EMERSON.
AEROPLANE.
APPLICATION FILED JUNE 27, 1911.
1,245,724.
Patented Nov. 6, 1917.
6 SHEETS—SHEET 1.
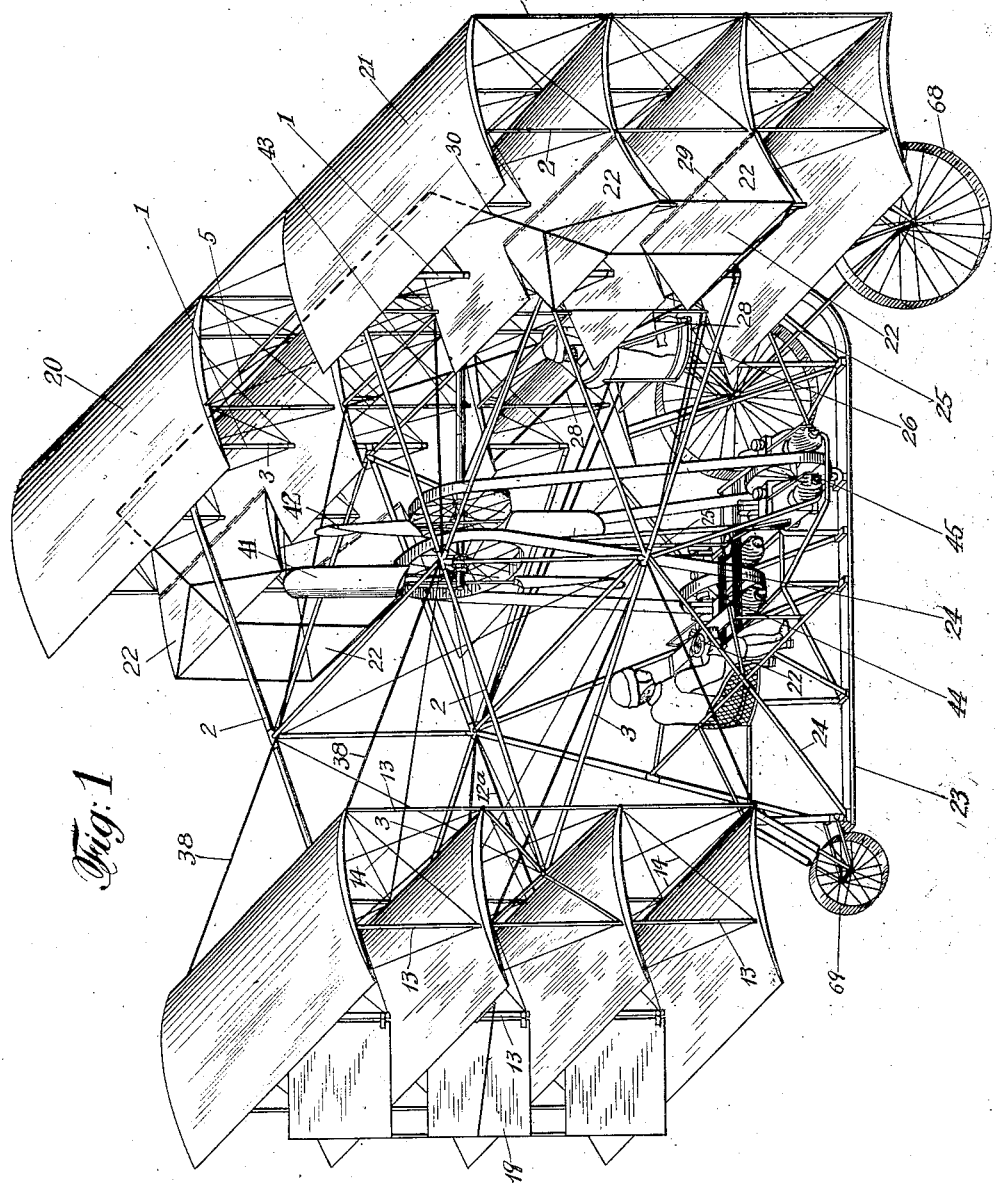

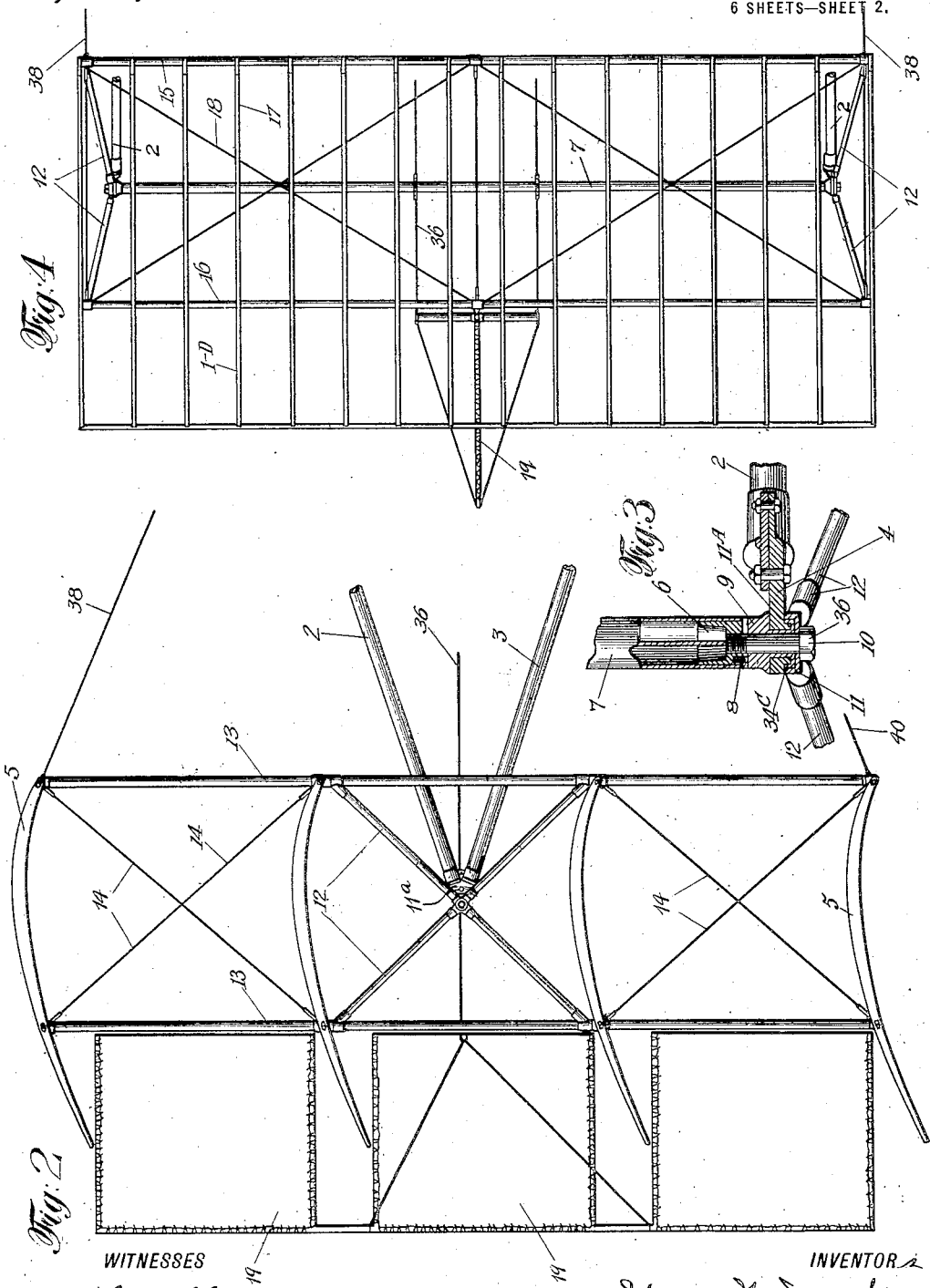

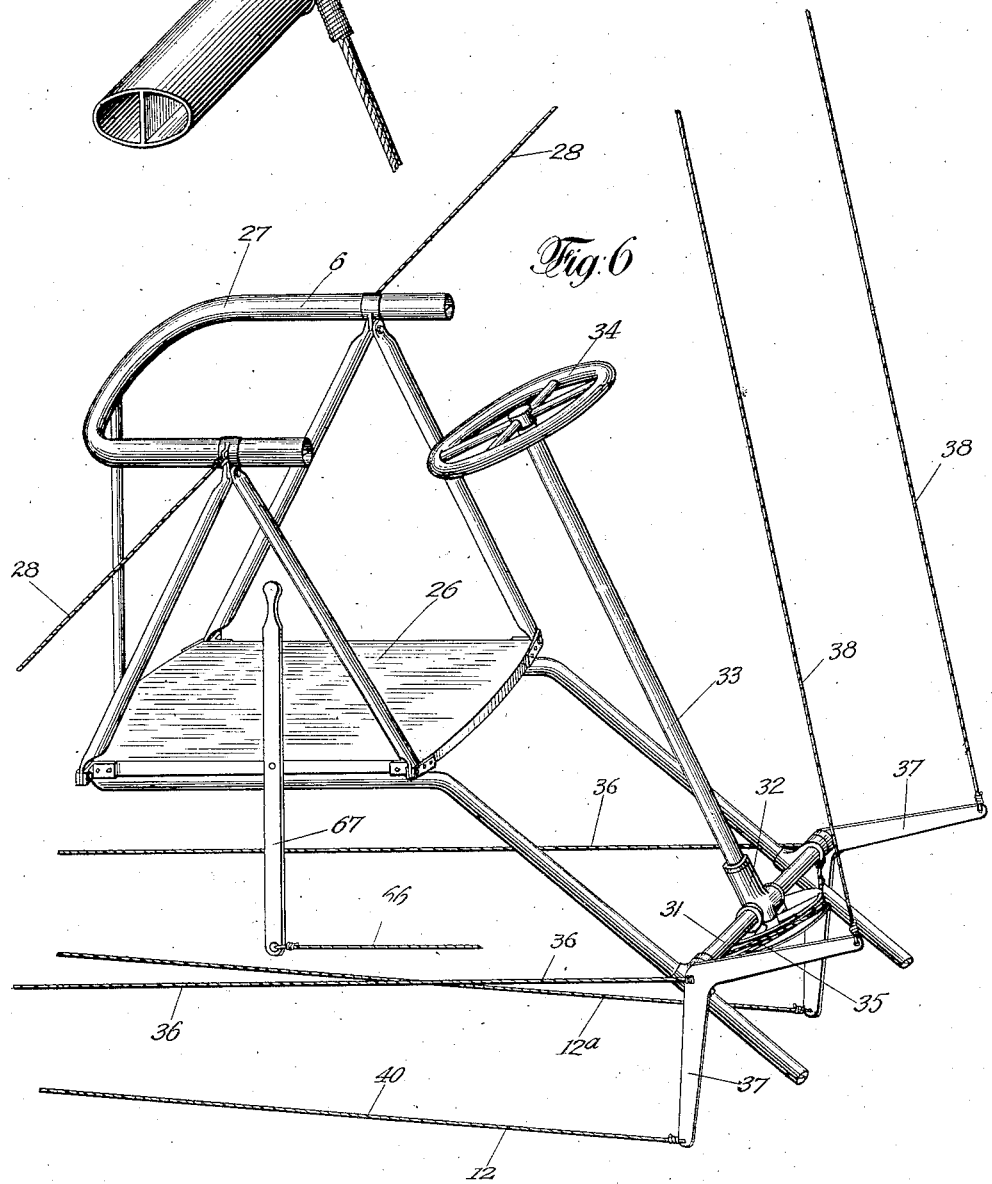

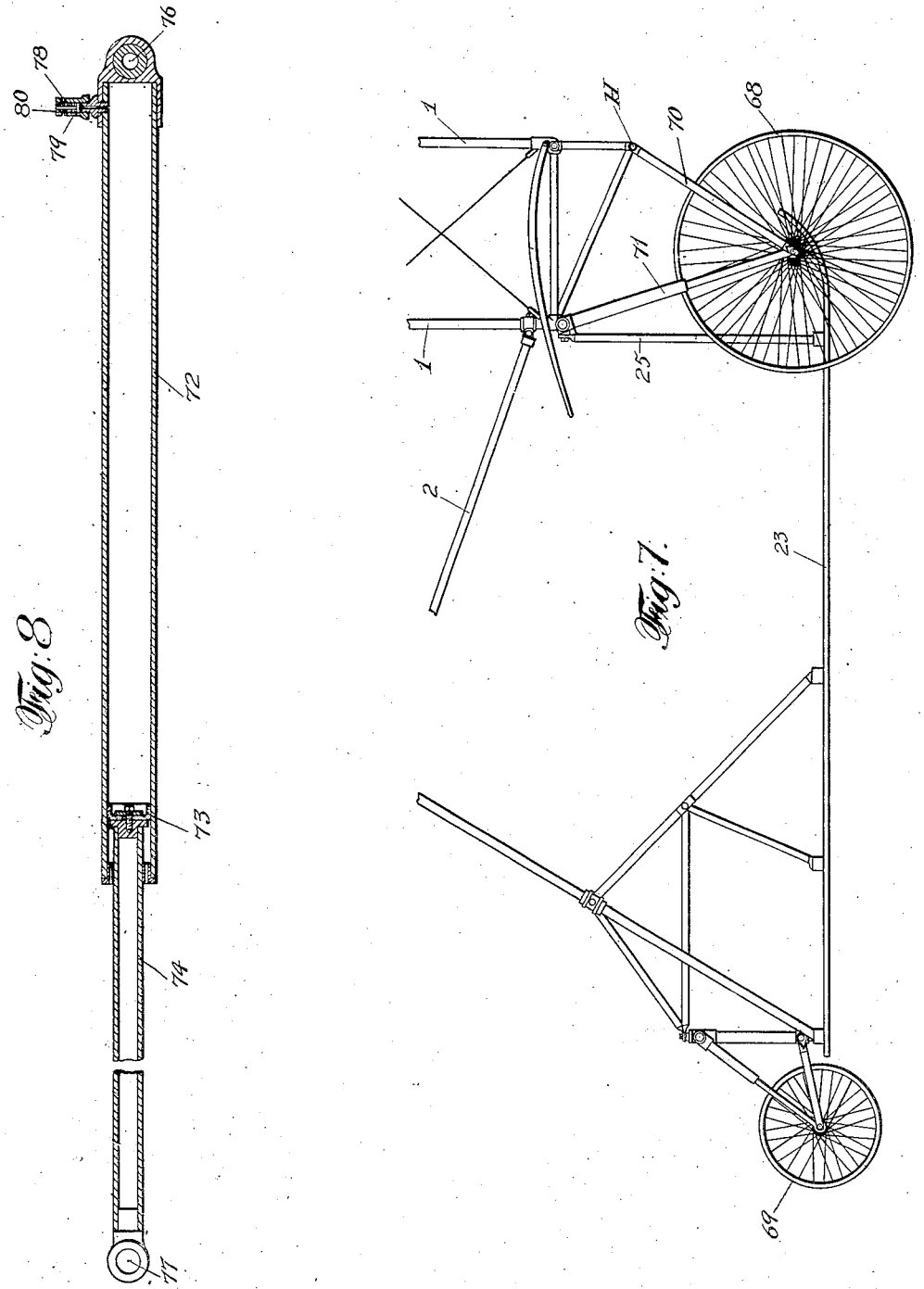

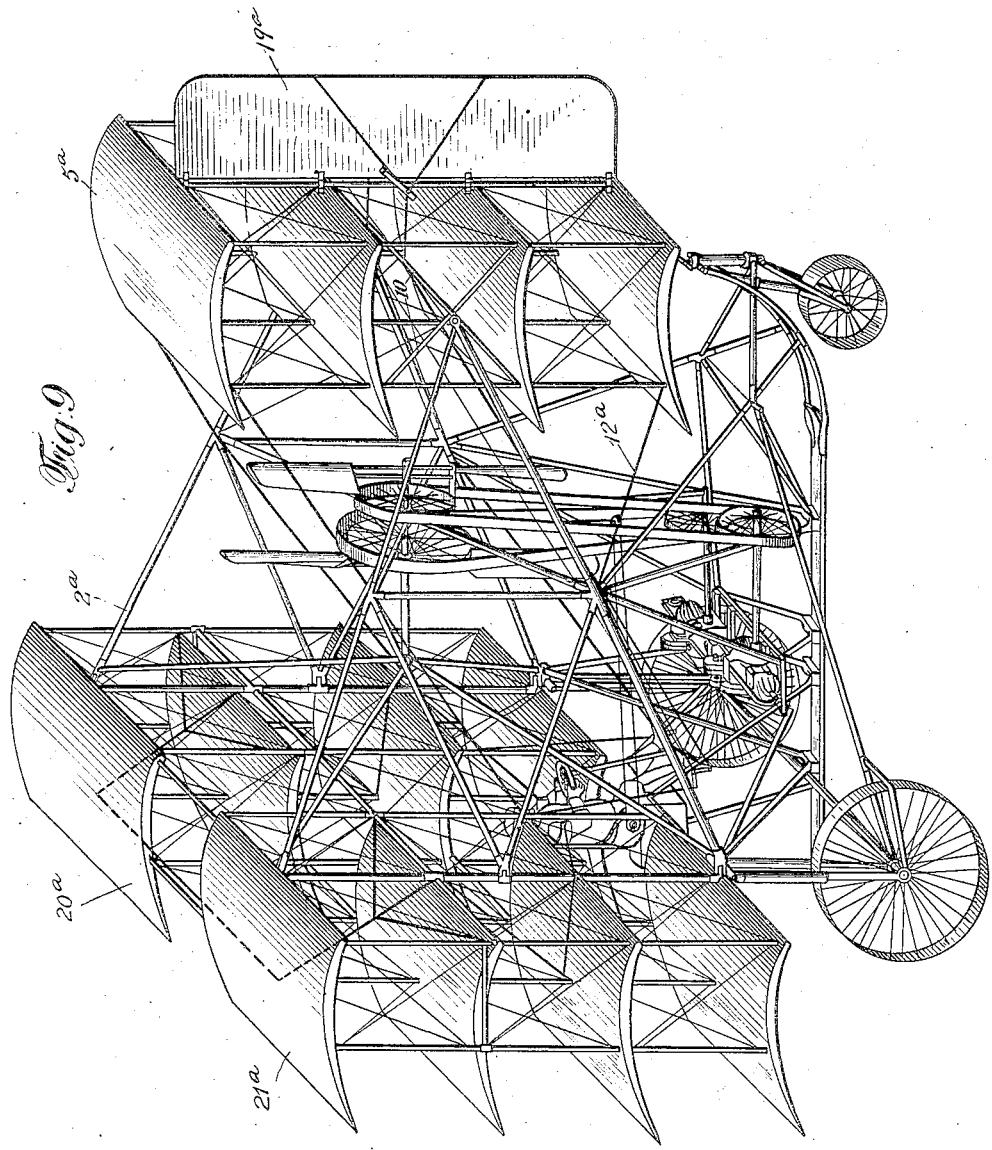

H. W. JACOBS & R. EMERSON.
AEROPLANE.
APPLICATION FILED JUNE 27, 1911.
1,245,724.
Patented Nov. 6, 1917.
6 SHEETS—SHEET 6.
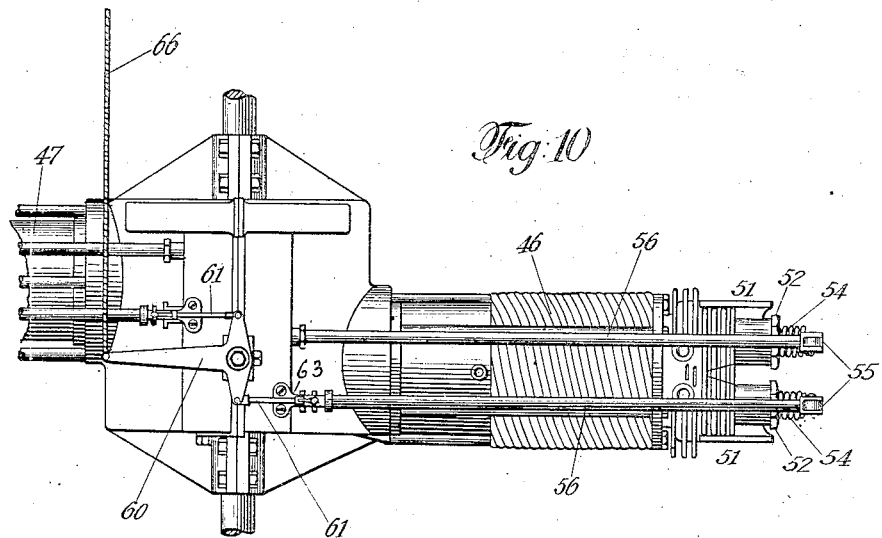
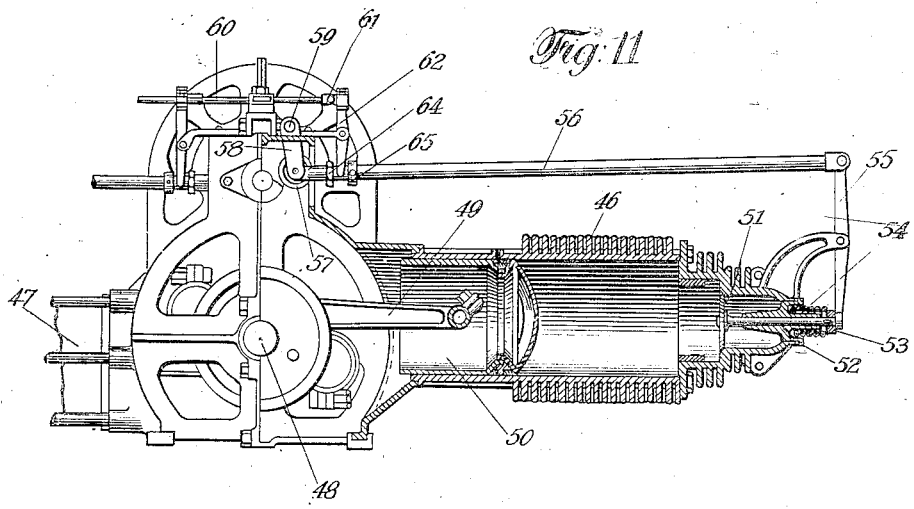
Witnesses:
E. Drollinger
G. L. Lloyd
Henry W. Jacobs
Raffe Emerson
Inventors
By Prindle & Wright
Attorneys

UNITED STATES PATENT OFFICE.

HENRY W. JACOBS AND RAFFE EMERSON, OF TOPEKA, KANSAS.

AEROPLANE.

1,245,724. Specification of Letters Patent. Patented Nov. 6, 1917.

Application filed June 27, 1911. Serial No. 635,622.

*To all whom it may concern:*

Be it known that we, HENRY W. JACOBS and RAFFE EMERSON, of Topeka, in the county of Shawnee and State of Kansas, have invented a certain new and useful Improvement in Aeroplanes, and do hereby declare that the following is a full, clear, and exact description thereof.

The object of our invention has been to provide an aeroplane having, among others, the following advantages: that it shall consist of forward and rear aerofoils, or planes, so as to afford great stability, and to permit the load, consisting of the engine and passengers, to be supported between such planes, and, more specifically, that it shall consist of three (3) aerofoils, or planes, or sets thereof, arranged, horizontally, like the three angles of a triangle, so as to permit the load to be supported within such triangle, and thus to afford both lateral and longitudinal stability to the aeroplane.

A further object is to arrange such aerofoils, or planes, in tiers, or series, one above the other, so as to secure great lifting power in a machine of small horizontal dimensions.

A further object is to place the center of gravity of such a machine at a lower level than the average center of pressure of all the aerofoils, thus tending to make a machine of great stability, and automatically balancing.

A further object is to provide a running gear, comprising both wheels and skids, thus making the machine light-running and easy to start, and yet giving it great strength to withstand a clumsy, or too sudden, landing.

A further object is to provide two or more units of power capable of being independently operated, thus permitting propellers to be operated either at the same, or different, speeds, and in the same, or opposite, directions, and making doubly sure that the power will not give out during flight.

A further object is to so construct the aerofoils that they may be used as rudders, to cause the rising or descent of the machine.

A further object is to provide automatic means for starting the engine during flight, and our particular construction comprises means for relieving the compression so that the windmill action of the propellers may set the engine in motion sufficiently to enable it to be started, and to such ends our invention consists in the aeroplane hereinafter specified.

In the accompanying drawings,

Figure 1 is a perspective view of a machine embodying our invention;

Fig. 2 is a side elevation of the rear tier of aerofoils, and the rear rudder;

Fig. 3 is a detail partly in section of a joint in the framework;

Fig. 4 is a plan view of the framework of Fig. 2;

Fig. 5 is a detail view showing the connection of a controller wire to a frame member;

Fig. 6 is a perspective view of the aviator's seat, with the parts by which he controls the steering;

Fig. 7 is a side elevation of the running and alighting gear;

Fig. 8 is a detail sectional view of one of the pneumatic shock absorbers;

Fig. 9 is a perspective view of another embodiment of our invention, in which there are one tier of planes at the forward end of the machine, and two tiers at the rearward end;

Figs. 10 and 11 are, respectively, a plan view and a vertical partially-sectional view of our engine showing means for opening the exhaust.

While we have illustrated our invention by the best embodiment known to us, the machine shown in our drawings, and described in this specification, is to be regarded only as typical of many possible embodiments, and our invention is not to be limited to the special features and details thereof.

The illustrated machine comprises a main frame, composed of forward vertical bars 1, from which an upper bar 2, extends rearwardly from the upper end of each bar 1, to meet a lower bar 3, extending rearwardly from the lower ends of the bars 1. Each bar 2, supports a bearing plate 4, as shown in Fig. 3, for the rear tier of planes 5. The details of the bearing may be widely varied, but the particular bearing shown consists of a ferrule 6, brazed or otherwise secured in the end of a tube 7, and provided with a dowel pin 8, engaging a slot in a collar-bushing 9. A bolt 10 passes through the bushing and is threaded into the ferrule, the dowel pin preventing the bushing from turning with the bolt. A connecting plate 11ª is mounted on the bolt, and an anti-friction collar 11 is interposed between such bolt and the plate 4.

The tube 7 connects the pivot joints at opposite sides of the machine. The connecting plate 11ª connects the members 12 of side frames for the rear tier of planes 5. Vertical members, or tubes, 13 are connected to the members 12, and carry the planes 5. Bracing wires 14 are secured to the uprights 13, and to the planes for stiffening.

Transverse forward and rearward horizontal tubes, or members, 15 and 16, respectively, connect the forward and rearward uprights 13, and support ribs 17 of the planes. Horizontal, diagonal bracing wires 18 are also preferably provided to stiffen the frame-work horizontally. It will thus be seen that the tier of planes 5 are mounted on a frame-work so that, while they are relatively immovable to each other, the whole frame-work can be swung in a vertical frame about the pivots, which are so located that the resistance of the planes, above and below them, are substantially equal. This enables the tier of planes to be swung as a unit in a vertical plane, and thus to act as a horizontal rudder to cause the aeroplane to rise or descend. A rudder 19 is pivoted on one of the rear vertical bars 13, and placed centrally of the machine, the rudder consisting of a rectangular frame-work covered with sheet material, pivoted to the bar 13, and having openings to permit it to swing without interfering with the rear ends of the planes 5.

At the forward end of the machine are two vertical tiers of aeroplanes 20 and 21, which are constructed like the planes 5, and supported on the frame-work in the same manner, with the following exception: Ailerons 22 are formed by hinging a portion of the rearward extension of certain of the planes 20 and 21, for the purpose of balancing.

A skid 23 is supported by the frame-work below in any desired manner. For instance, it is connected to the bars 3 by means of members or bars 24 running from the rear end of the skid to the centers of the bars 3. The skid is connected at its forward end with the lower ends of the bars 1 by diagonal bracings 25. Bracing members and wires are provided which it is unnecessary to describe.

The aviator's seat 26 (Fig. 6) is supported on the frame-work by bracing unnecessary to describe. A yoke 27 is supported from the sides and back of the seat by uprights pivoted to the yoke, and to each other, so that the yoke may be moved laterally by the swaying of the aviator's body. The yoke is connected, by wires or cables 28, with the lower ailerons. The ailerons on each side are connected together by cables or wires 29, and the two sets of ailerons are connected by a cable 30 extending upward from each tier of ailerons, and running across over pulleys. Thus when the aviator sways his body, he draws down the tier of ailerons on one side, and the connecting cable 30 draws up the tier upon the opposite side.

A shaft 31 is journaled horizontally below and in front of the aviator's seat, and carries a bearing 32 for a steering shaft 33, on whose upper end is a steering wheel 34. The lower end of the shaft carries a pulley 35 around which runs a cable 36, the opposite ends of which are guided by means of pulleys to opposite sides of the vertical rudder 19. Thus, by turning the hand-wheel, the vertical rudder can be operated.

Bell-cranks 37 are attached to the outer ends of the shaft 31 so that, when the said shaft is swung by pushing the steering wheel forward or back, the bell-cranks will also be swung. The upper arms of the bell-cranks have cables 38 attached to them, which, passing over pulleys, are attached to the upper portion of the frame-work of the rear tier of planes. The lower bell-crank arms have cables 40 attached thereto, which are attached to the lower end of the frame-work of the rear tier of planes 5. Thus, by pushing the hand-wheel forward or back, the aviator can swing the rear tier of planes and cause the machine to ascend or descend. By turning the hand-wheel he can swing the vertical rudder and turn the machine to the right or left. And by swaying his body he can move the ailerons down on the side of the machine tending to dip downward, and at the same time move those up on the side of the machine tending to tip upward, and thus maintain his balance.

To propel the machine, we preferably provide two or more propellers 41 and 42 which are preferably mounted on the same axis, such, for instance, as the shaft 43 which axis is preferably located both horizontally and vertically at the center of resistance of the machine, which would be at the center of the machine laterally and about midway vertically between the topmost and lowermost planes. We preferably drive each propeller by a separate engine, for instance, the propeller 41 is driven by an engine 44 mounted at one side of the center of the machine, and the propeller 42 is driven by an engine 45 mounted on the other side of the center of the machine. As the propellers are entirely independent of each other and separately driven, they may be rotated either in the same or in opposite directions, and at the same or different speeds, and the accidental stopping of one engine will not leave the machine in the dangerous condition of having its power shut off while in flight, since the other engine and propeller will afford sufficient propelling effect to permit either continued navigation or a safe landing.

We desire to provide means which will facilitate the starting of the engine or engines during flight, when they have been stopped either accidentally or by the engineer.

Our conception is to utilize the torque of the propellers due to the windmill action as the momentum of the machine carries them through the air. In order to do this, we relieve the engine of the load of compressing the contents of the cylinder until a sufficient speed of rotation has been obtained to enable the momentum of the mechanism together with the windmill action of the propellers to compress and explode a charge. This can be accomplished by any means which will relieve the engine of the load of compressing the charges in the cylinders. The manner in which we prefer to perform this function is to open the exhaust valves and hold them open until the desired momentum has been obtained. In Figs. 10 and 11, we have illustrated the details of our preferred form of mechanism for this purpose. In such construction the engine consists of cylinders 46 and 47 forming part of a frame in which rotates a crank shaft 48. A connecting rod 49 is pivoted to a piston 50. The exhaust is controlled by an exhaust valve 51, having a stem 52, carrying a collar 53, between which and the cylinder-head is interposed a compression spring 54. A lever 55 bears against one end of the valve stem and at its opposite end is pivoted to a rod 56, carrying a roller 57, the latter being forced by the spring 54 against a cam on the usual cam-shaft. The cam end of the rod 56 is pivoted to a link 58 hung from a pivot 59 on the frame. The mechanism described is duplicated for each cylinder of the engine. In order to hold the exhaust valve open, the following parts are provided: A bell-crank 60 is pivoted on the top of the casing, such crank having two short arms and a long arm. Each short arm is pivoted to a link 61 that is pivoted to the upper end of a lever 62, the latter being fulcrumed on a bracket 63 on the frame. The lower end of the lever straddles the rod 56 engaging the rod between a nut 64 and a collar 65 thereon. The long arm of the bell-crank 60 is connected by a wire 66 to a hand-lever 67 fulcrumed on the aviator's seat.

When it is desired to start the engine during a flight of the aeroplane, the aviator moves the hand-lever 67 forward, pulling the wire 66, swinging the bell-crank 60, thus through the levers 62 forcing the rods 56 away from their cams and opening the exhaust valve. This relieves the engine of the load of compressing the charge in the cylinder, and allows the windmill action of the propellers to set the engines in motion. When sufficient momentum has thus been acquired so that, with the windmill action of the propellers the charge is the cylinders can be compressed, the hand-lever 67 is released and the next reciprocation of the pistons will cause the compression of the charge and the starting of the engines.

The running gear consists of forward wheels 68, and a rear wheel 69. The forward wheels are supported from the frame by bars 70 pivoted at their upper ends to the frame, and at their lower ends to the axle of the wheels, which bars are preferably not variable in length. The said wheels are also supported by composite bars 71 (Fig. 8), which are pivoted at their upper ends to the frame of the machine, and at their lower ends to the axle, and which yieldingly shorten under the blow of the wheel striking the ground in landing. Each bar 71 consists of a cylinder 72 containing a piston 73 having a piston-rod 74 attached thereto, and sliding in a collar 75 fastened in the cylinder. The cylinder carries an eye 76 by which it is pivoted to the frame, and the piston-rod carries an eye 77 by which it is pivoted to the axle. The piston preferably consists of a cup-leather so that air may pass the piston as it is retracting and is trapped as the piston is driven forward. A valve 78 controls the escape of air from piston, the valve being governed by a spring 79 whose tension can be regulated by a screw-cap 80.

Thus, when the wheels strike the ground, the pistons are driven upward and compress the air in the cylinders, thus affording a cushioned and yielding resistance to the rise of the wheels.

The rear wheel 69 is mounted in the same manner as the forward wheels, and it is therefore unnecessary to explain the mounting in detail.

The wheels, normally, stand at a lower level than the skid, but if the machine should land with a shock greater than the wheels or their cushioning devices would stand, the skid would then bear upon the earth and support the machine.

It will be observed that, as our areoplane is (considered horizontally) supported by three planes, or tiers of planes, while the load is principally in the center and relatively low down, the support afforded by the planes is like that of the legs of a stool, so that great lateral stability is obtained. The arranging of the planes in tiers, and placing the load relatively low down, tends to make the aeroplane self-balancing and yet to make it very compact. The lifting power is very great compared with the cubical space occupied by the machine. The wheels, having sufficient strength to support the weight of the machine, except when it strikes the ground with a blow in landing, afford a support with little resistance to travel over the ground, so that the machine can readily take flight, and yet the skid will assume the support of the machine if, in landing, it should strike the ground with more force than the wheels can safely resist.

While all of our propeller action is central to the machine, our providing separate motors for each of two separate propellers makes doubly sure that the aeroplane shall not be left helpless through the giving out of its power.

The pivoting of one tier of aerofoils affords a very effective and convenient means for steering, up or down, without a special rudder for that purpose.

We prefer to revolve the propellers in opposite directions creating a gyroscopic action useful in maintaining the horizontal equilibrium of the machine.

Our aeroplane is rendered doubly safe by the fact that we have provided efficient means by which the windmill action of the propellers can be made to start the engines.

That form of our invention which is illustrated in Fig. 9 differs from the one previously described chiefly in that the single tier of planes 52 (corresponding to the tier 5 in the earlier form) is mounted in the front of the machine, and the two rear tiers 20ª and 21ª (corresponding to the tiers 20 and 21 of the earlier form) are mounted in the rear of the machine. The rudder 19ª (corresponding to the rudder 19 of the earlier form) is also mounted in the front of the machine. It is not necessary to further describe the details of this form of our invention.

We claim:

1. An aeroplane having three supporting planes whose centers of resistance are located triangularly relative to each other in a horizontal direction and a motor driven propeller located in the center of the triangular space between the planes.

2. An aeroplane having three tiers of supporting planes whose centers of resistance are located triangularly relative to each other in a horizontal direction and a motor driven propeller located in the center of the triangular space between the planes.

In testimony that we claim the foregoing we have hereunto set our hands.

HENRY W. JACOBS.
RAFFE EMERSON.

Witnesses:
  EDWIN J. PRINDLE.
  V. G. LLOYD.